(12) United States Patent
Yoshifusa et al.

(10) Patent No.: US 9,122,363 B2
(45) Date of Patent: Sep. 1, 2015

(54) TOUCH PANEL

(75) Inventors: Kazuyuki Yoshifusa, Tokyo (JP);
Koichi Kondoh, Tokyo (JP); Takashi Nakajima, Tokyo (JP); Genichi Matsuda, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 591 days.

(21) Appl. No.: 13/315,383

(22) Filed: Dec. 9, 2011

(65) Prior Publication Data

US 2012/0154309 A1    Jun. 21, 2012

(30) Foreign Application Priority Data

Dec. 15, 2010    (JP) ................. 2010-279716

(51) Int. Cl.
*G06F 3/041*    (2006.01)
*G06F 3/047*    (2006.01)
*G06F 3/045*    (2006.01)

(52) U.S. Cl.
CPC .............. *G06F 3/047* (2013.01); *G06F 3/045* (2013.01); *G06F 2203/04103* (2013.01)

(58) Field of Classification Search
CPC ......... G06F 3/041; G06F 3/045; G06F 3/047; G06F 2203/04113

USPC .......................... 345/156, 173–176; 361/748
See application file for complete search history.

(56) References Cited

U.S. PATENT DOCUMENTS

| | | | | |
|---|---|---|---|---|
| 2009/0314621 | A1* | 12/2009 | Hotelling | 200/600 |
| 2010/0182277 | A1* | 7/2010 | Nakajima et al. | 345/174 |
| 2010/0201640 | A1* | 8/2010 | Nozawa et al. | 345/173 |
| 2010/0265198 | A1* | 10/2010 | Kondoh et al. | 345/173 |

FOREIGN PATENT DOCUMENTS

| | | |
|---|---|---|
| JP | 2004-272722 | 9/2004 |
| JP | 2008-293129 | 12/2008 |

* cited by examiner

*Primary Examiner* — Kent Chang
*Assistant Examiner* — Herbert L Hagemeier
(74) *Attorney, Agent, or Firm* — IPUSA, PLLC

(57) ABSTRACT

Disclosed is a touch panel including a first electrode substrate including a first conductive layer; and a second electrode substrate including a second conductive layer and being stacked with the first electrode substrate such that the first conductive layer and the second conductive layer face each other. The first conductive layer is composed of a first line of conductive areas and a second line of conductive areas adjacent to the first line where each of the first and the second lines includes an odd number greater than or equal to three of the conductive areas aligned in a second direction, and the conductive areas positioned in the middle of the first line and the second line are respectively connected with extracting areas extending toward different edges in the second direction.

16 Claims, 15 Drawing Sheets

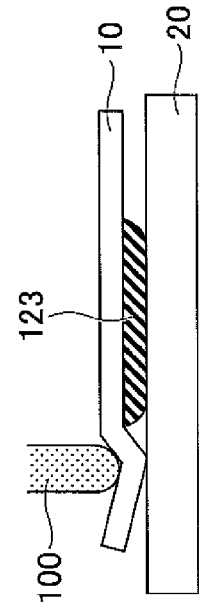
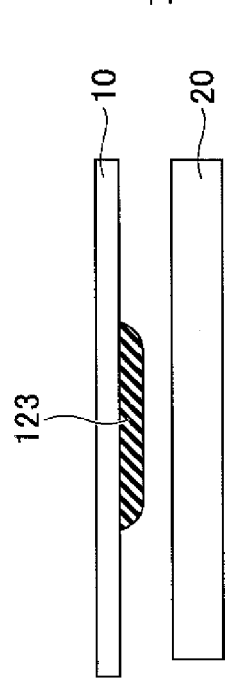
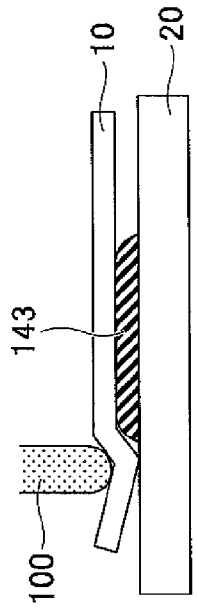
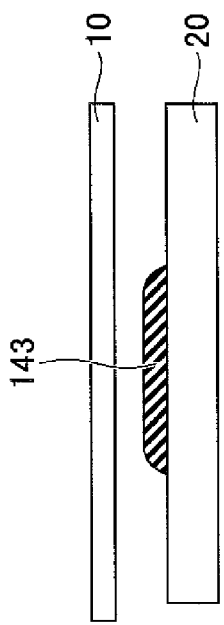

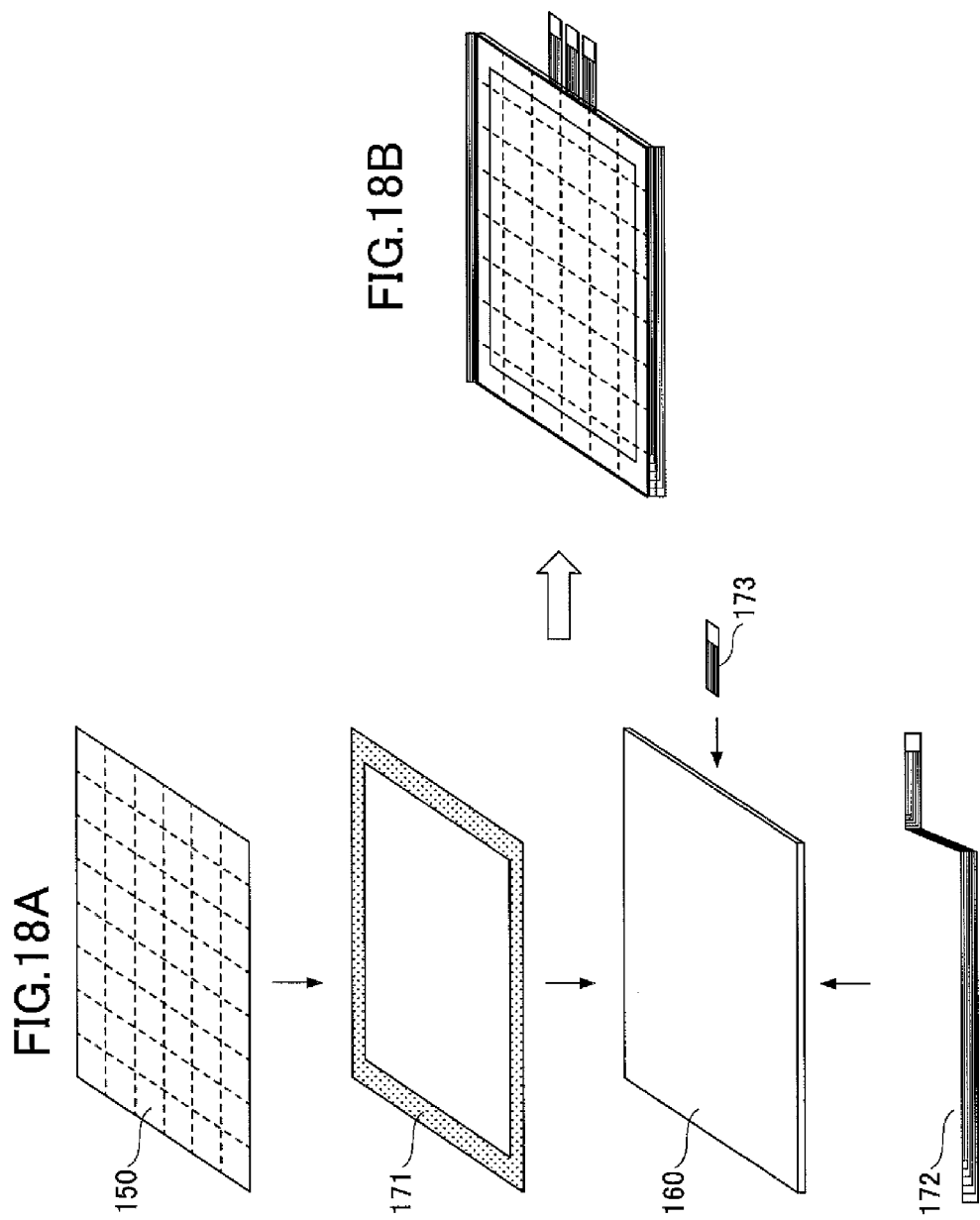

TOUCH PANEL

BACKGROUND OF THE INVENTION

1. Field of the Invention

The present invention relates to a touch panel.

2. Description of the Related Art

A touch panel is an input device provided in front of a display and capable of inputting data. As a user can directly input data based on information visually grasped by viewing the display through the touch panel, the touch panel is used in various ways.

A type of touch panel where a resistance film is used is known. The touch panel of this type includes an upper electrode substrate including a transparent conductive layer formed on its surface and a lower electrode substrate including a transparent conductive layer formed on its surface. The upper electrode substrate and the lower electrode substrate are stacked with the transparent conductive layers facing each other. Here, the transparent conductive layer of the lower electrode substrate functions as the resistance film. With this structure, when a force is applied to a point on the upper electrode substrate, the transparent conductive layer of the upper electrode substrate and that of the lower electrode substrate make contact so that the position where the force is applied can be detected.

For the touch panel of the type where the resistance film is used, a four-wire type and a five-wire type exist. For the four-wire type, electrodes for the X-axis direction and electrodes for the Y-axis direction are provided at different ones of the upper electrode substrate and the lower electrode substrate. For the five-wire type, both of the electrodes for the X-axis direction and the electrodes for the Y-axis direction are provided at the lower electrode substrate, where the upper electrode substrate functions as a probe to detect a voltage (see Japanese Laid-open Patent Publication NO. 2004-272722 or Japanese Laid-open Patent Publication NO. 2008-293129, for example).

The structure of the touch panel of the five-wire type will be explained with reference to FIG. 1 and FIG. 2. FIG. 1 is a perspective view of the touch panel 200 of the five-wire type. FIG. 2 is a cross-sectional view of the touch panel 200 of the five-wire type.

The touch panel 200 of the five-wire type includes a film 210 that functions as the upper electrode substrate, a glass sheet 220 that functions as the lower electrode substrate, and spacers 250. The film 210 includes a transparent conductive layer 230 formed on its surface. The glass sheet 220 includes a transparent conductive layer 240 formed on its surface. The film 210 and the glass sheet 220 are stacked through the spacers 250 with the transparent conductive layer 230 and the transparent conductive layer 240 facing each other. The touch panel 200 is connected with a host computer, not shown in the drawings, through a cable 260.

As shown in FIG. 3A, the touch panel 200 further includes four electrodes 241, 242, 243 and 244 at respective four edges of the rectangular transparent conductive layer 240 of the glass sheet 220. Here, voltage is alternately applied in the X-axis direction (lateral direction) through the electrodes 242 and 244 and in the Y-axis direction (longitudinal direction) through the electrodes 241 and 243. With such a structure, when the transparent conductive layer 230 is pushed by a finger or the like at a point A and the transparent conductive layer 230 and the transparent conductive layer 240 contact at the point A, an electric potential Va is detected through the transparent conductive layer 230 as shown in FIG. 3B to detect a contacted position in the X-axis direction and in the Y-axis direction.

However, for the above touch panel of the five-wire type, it is impossible to detect when plural positions are contacted at a same time although it is possible to detect a single contacted position.

As shown in FIG. 4A, when the transparent conductive layer 230 is pushed by fingers or the like at points A and B at a same time and the transparent conductive layer 230 and the transparent conductive layer 240 contact at the points A and B, while alternately applying voltage in the X-axis direction (lateral direction) and in the Y-axis direction (longitudinal direction), a middle point between the points A and B, which is not pushed, is detected as a contacted position. This is because the contacted position is detected by the electric potential as shown in FIG. 4B. As shown in FIG. 4B, even when the transparent conductive layer 230 and the transparent conductive layer 240 contact at the points A and B, only the electric potential Vc is detected and the contacted position is detected as a single position.

In order to solve such a problem, the transparent conductive layer 230 in a rectangular shape of the upper electrode substrate of the touch panel may be separated into plural areas to detect plural positions when plural points are pushed at a same time.

However, when separating the transparent conductive layer of the upper electrode substrate into the plural areas, there exist areas which are not positioned at the edges (periphery) of the upper electrode substrate. For those areas, extracting areas which are connected to those areas and extend between those areas and the edges of the upper electrode substrate are necessary. In such a case, the layout or the structure of the extracting electrodes needs to be considered in order to retain operational functions.

SUMMARY OF THE INVENTION

The present invention is made in light of the above problems, and provides a touch panel capable of retaining its operational functions even when the conductive layer is separated into plural areas for detecting plural contact points at a same time.

The present invention has been made based on the knowledge the inventors have thus obtained and has the following configurations.

According to an embodiment, there is provided a touch panel including a first electrode substrate that includes a first substrate and a first conductive layer formed on the first substrate; a second electrode substrate that includes a second substrate and a second conductive layer formed on the second substrate and is stacked with the first electrode substrate such that the first conductive layer and the second conductive layer face each other; and electrodes provided at four edges of the second conductive layer to generate an electric potential distribution in the second conductive layer. The first conductive layer is composed of a first line of conductive areas and a second line of conductive areas adjacent to the first line in a first direction where each of the first and the second lines includes an odd number greater than or equal to three of the conductive areas aligned in a second direction different from the first direction between a first edge and a second edge of the first conductive layer aligned in the second direction, each of the conductive areas not positioned at the first or the second edges of the first electrode substrate is connected with an extracting area that extends toward one of the first and the second edges, and one of the conductive areas positioned in the middle of the first line is connected with the extracting area extending toward the first edge and one of the conductive areas positioned in the middle of the second line is connected with the extracting area extending toward the second edge.

According to another embodiment, there is provided a touch panel including a first electrode substrate that includes a first substrate and a first conductive layer formed on the first substrate, the first conductive layer being composed of plural conductive areas and plural extracting areas respectively connected to the conductive areas positioned away from edges of the first electrode substrate and extending toward one of the edges; a second electrode substrate that includes a second substrate and a second conductive layer formed on the second substrate and is stacked with the first electrode substrate such that the first conductive layer and the second conductive layer face each other; electrodes provided at four edges of the second conductive layer to generate an electric potential distribution in the second conductive layer; and an insulating layer selectively positioned at the extracting areas of the first conductive layer between the first conductive layer and the second conductive layer and having a thickness less than or equal to 20 μm.

BRIEF DESCRIPTION OF THE DRAWINGS

Other objects, features and advantages of the present invention will become more apparent from the following detailed description when read in conjunction with the accompanying drawings.

FIG. 33 is an explanatory view showing an electric potential for detecting a contacted position;

FIG. 15A and FIG. 15B are explanatory views where an insulating layer is formed between the upper electrode substrate and the lower electrode substrate;

FIG. 16A and FIG. 16B are explanatory views where an insulating layer is formed between the upper electrode substrate and the lower electrode substrate;

FIG. 18A and FIG. 18B are explanatory views for explaining a method of forming the touch panel of the present embodiment.

DETAILED DESCRIPTION OF THE PREFERRED EMBODIMENTS

Figure 1:
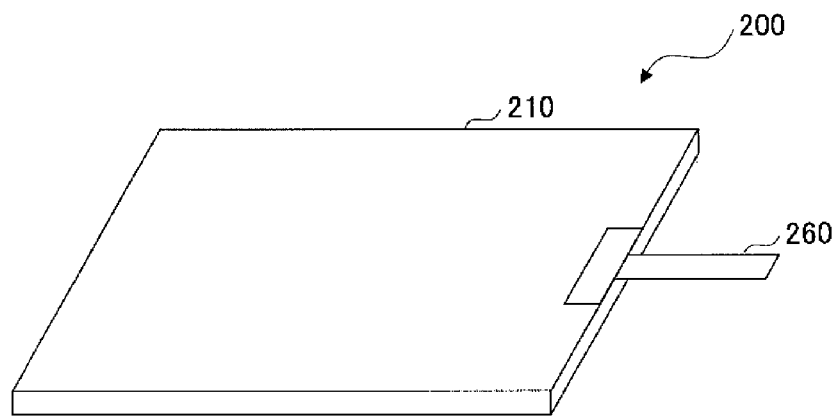
FIG. 1 is a perspective view of a touch panel of a five-wire type.
Figure 2:
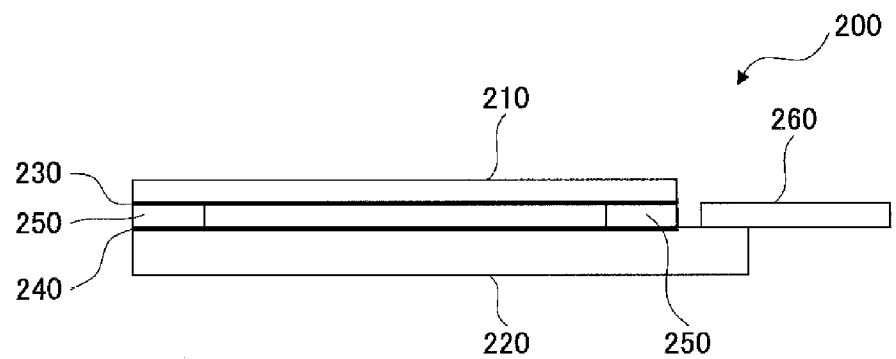
FIG. 2 is a cross-sectional view of the touch panel of the five-wire type.
Figure 3B:
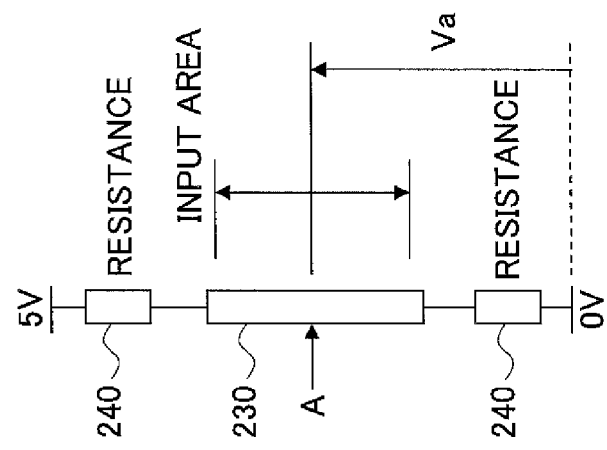
FIG. 3A is a perspective view of the touch panel of the five-wire type when being pushed.
Figure 3A:
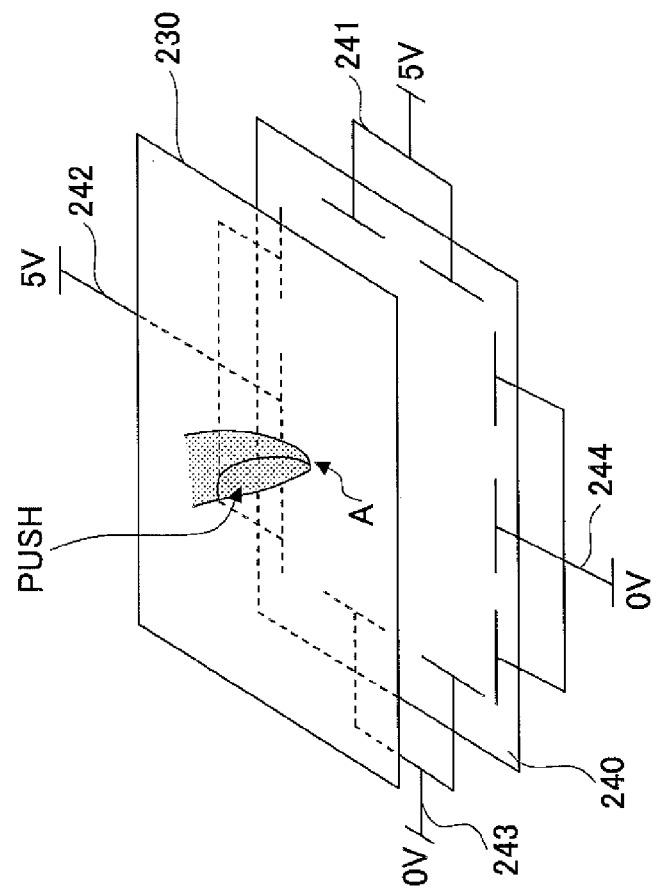
Figure 4A:
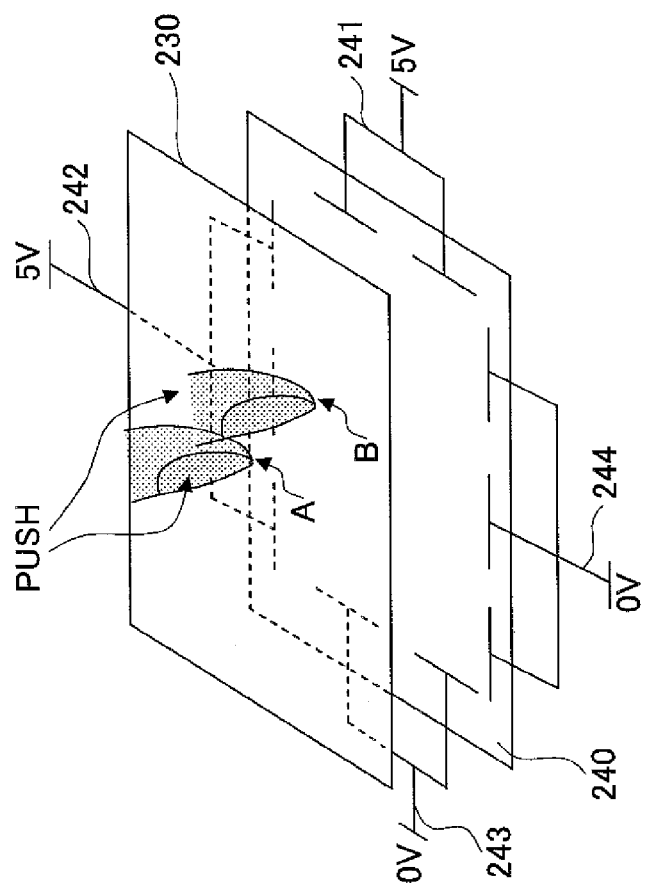
FIG. 4A is a perspective view of the touch panel of the five-wire type when being pushed.
Figure 4B:
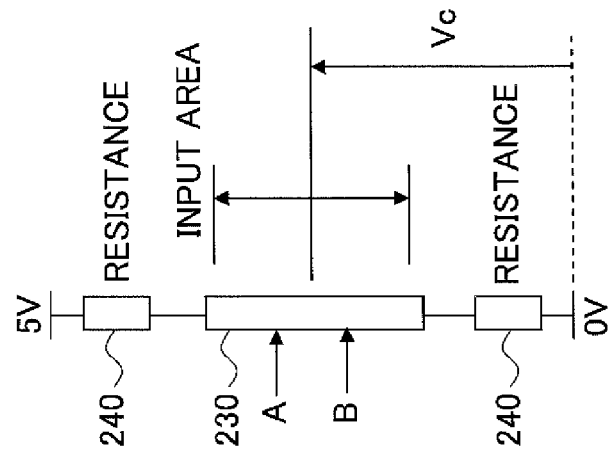
FIG. 4B is an explanatory view showing an electric potential for detecting a contacted position.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to drawings.

It is to be noted that, in the explanation of the drawings, the same components are given the same reference numerals, and explanations are not repeated.

In the following embodiments, the transparent conductive layer of the upper electrode substrate is separated into plural conductive areas for detecting plural contact points at a same time. In such a case, in order to electrically connect each of the conductive areas with a respective interconnect such as an extracting electrode, the conductive areas need to be extracted (extended) to corresponding edges of the upper electrode substrate. Therefore, each of the conductive areas which is not positioned at one of the edges is connected with a respective extracting area that extends toward one of the edges.

First Embodiment

When the number of separated conductive areas in one direction is an odd number, the number of the extracting areas extending toward one of the edges and number of the extracting areas extending toward another of the edges may be different, thereby causing an uneven layout. In such a case, the balance of the touch panel in total becomes bad and a desired touch panel may not be obtained.

Figure 10:
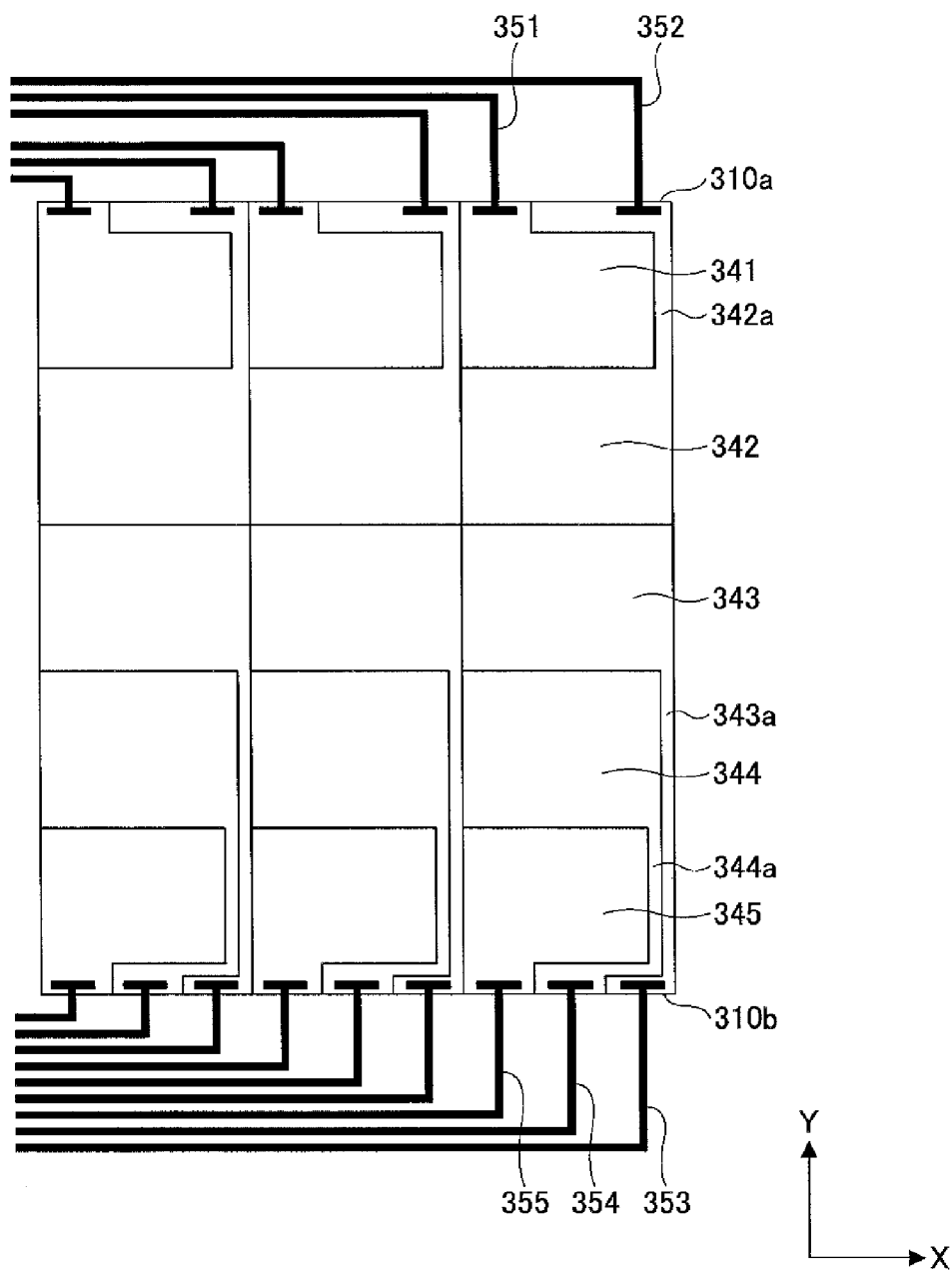
FIG. 10 is an enlarged plan view of a touch panel of another example.

FIG. 10 shows a structure of an example of a touch panel where the number of separated conductive areas in one direction is an odd number.

Here, the structure and the layout of the conductive areas and the extracting areas of a first transparent conductive layer of the upper electrode substrate and extracting electrodes are shown.

Referring to FIG. 10, the transparent conductive layer of the upper electrode substrate is separated into five conductive areas 341, 342, 343, 344 and 345 in the Y-axis direction. In this example, the extracting areas are extending toward either one of a first edge 310a and a second edge 310b which is opposing the first edge 310a in the Y-axis direction.

Among the five conductive areas 341, 342, 343, 344 and 345, the conductive area 341 formed at the first edge 310a is electrically connected with an extracting electrode 351 at the first edge 310a. The conductive area 342 near the first edge 310a is electrically connected with an extracting electrode 352 through an extracting area 342a at the first edge 310a.

The conductive area 345 formed at the second edge 310b is electrically connected with an extracting electrode 355 at the second edge 310b. The conductive area 344 near the second edge 310b is electrically connected with an extracting electrode 354 through an extracting area 344a at the second edge 310b. The conductive area 343 positioned in the middle is electrically connected with an extracting electrode 353 through an extracting area 343a at the second edge 310b.

Therefore, for the conductive areas 341 to 345, two of the extracting electrodes 351 and 352 are formed at the first edge 310a while three of the extracting electrodes 353, 354 and 355 are formed at the second edge 310b.

In FIG. 10, the same patterns of lines in the Y-axis direction as the line of conductive areas 341 to 345 are formed offset along the X-axis direction and the number of the extracting electrodes formed at the second edge 310b is larger than the number of the extracting electrodes formed at the first edge 310a. It means that the number of the extracting electrodes at the first edge 310a side and the number of the extracting electrodes formed at the second edge 310b side are uneven.

As for the present embodiment, a touch panel is provided where the number of interconnects functioning as the extracting electrodes are substantially even for both edges even when the conductive layer is separated into plural areas for detecting plural contact points at a same time. Therefore, a touch panel of uniform shape and desired configuration can be provided.

The structure of the touch panel according to the first embodiment will be explained.

Figure 5:
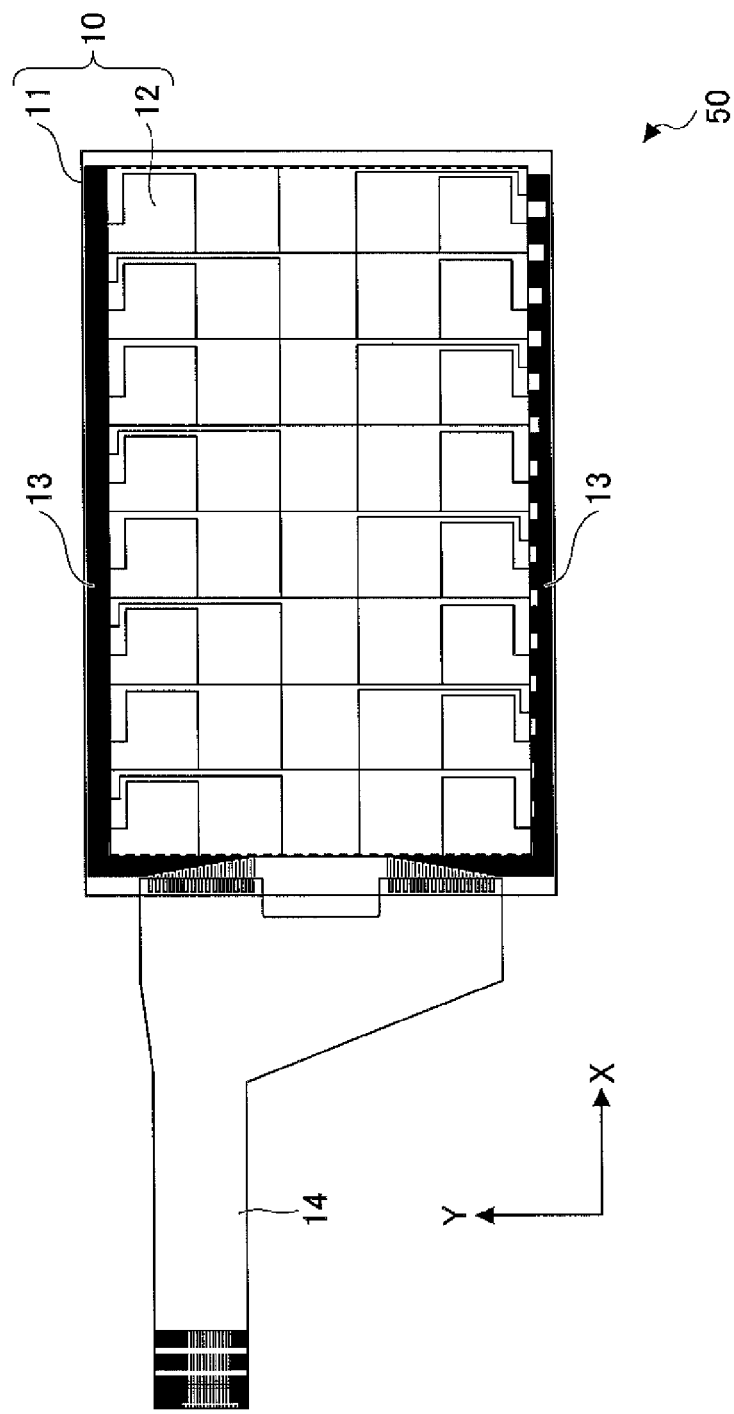
FIG. 5 shows a structure of an upper electrode substrate of a touch panel of the present embodiment.
Figure 6:
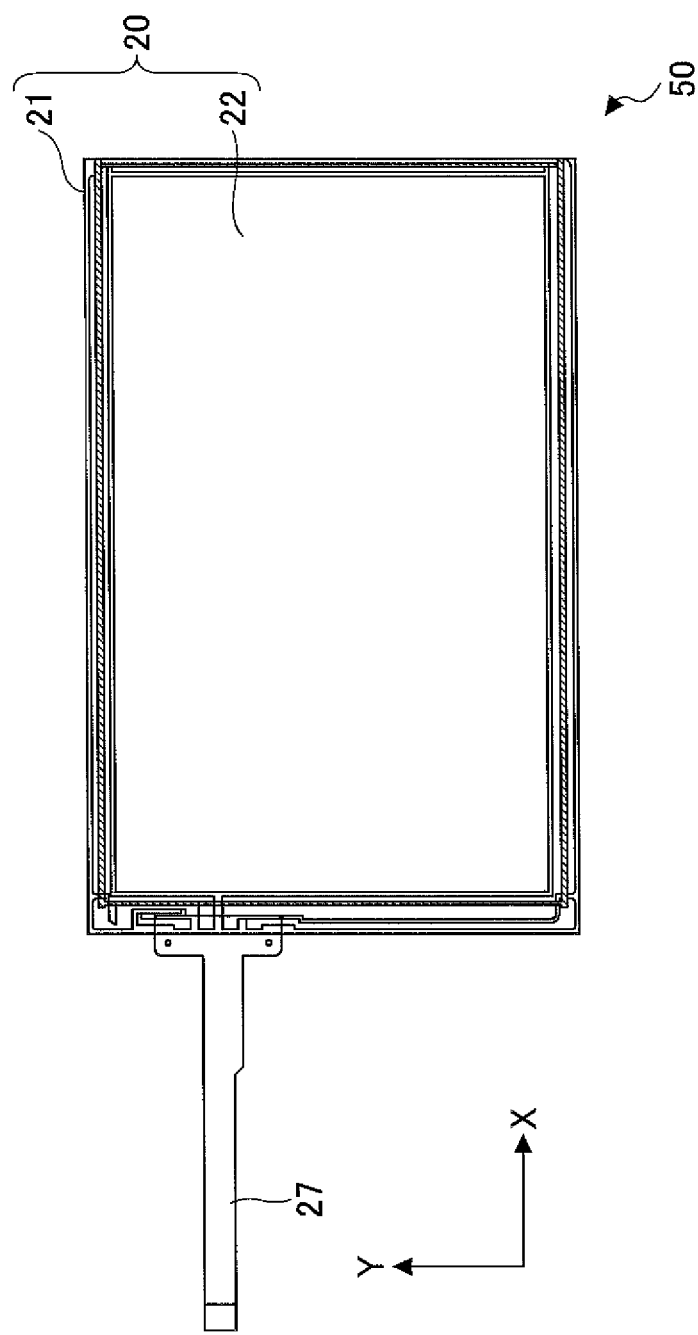
FIG. 6 shows a structure of a lower electrode substrate of the touch panel of the present embodiment.
Figure 7:
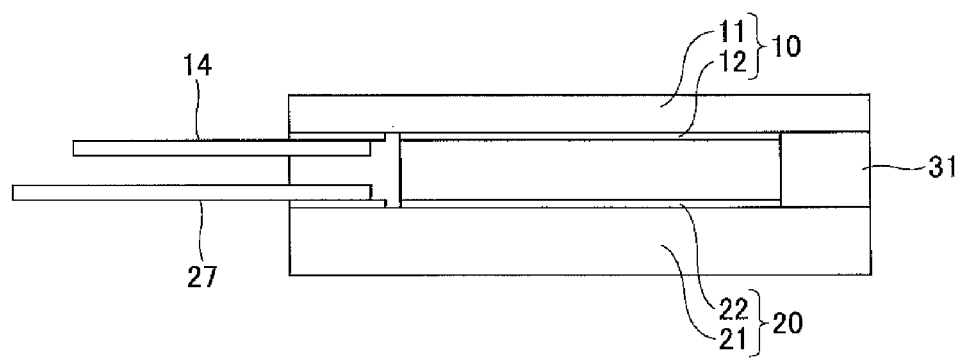
FIG. 7 is a cross-sectional view of the touch panel of the present embodiment.

FIG. 5 shows a structure of an upper electrode substrate of a touch panel 50 of the present embodiment. FIG. 6 shows a structure of a lower electrode substrate of the touch panel 50 of the present embodiment. FIG. 7 is a cross-sectional view of the touch panel 50 of the present embodiment.

The touch panel 50 of the present embodiment includes an upper electrode substrate 10 (a first electrode substrate) having a substantially rectangular shape in plan view, and a lower electrode substrate 20 (a second electrode substrate) having almost the same shape as the upper electrode substrate 10 in plan view.

The upper electrode substrate 10 includes a film substrate 11 (a first substrate), a transparent conductive layer 12 (a first conductive layer) formed at one surface of the film substrate 11, and spacers 31.

The lower electrode substrate 20 includes a glass substrate 21 (a second substrate) and a transparent conductive layer 22 (a second conductive layer) formed at one surface of the glass substrate 21.

The upper electrode substrate 10 and the lower electrode substrate 20 are stacked separated by the spacers 31 or the like and connected by an adhesive material or an adhesive tape (double-sided tape) so that the first transparent conductive layer 12 of the upper electrode substrate 10 and the second transparent conductive layer 22 of the lower electrode substrate 20 face each other.

In this embodiment, the first transparent conductive layer 12 of the upper electrode substrate 10 is separated into 40 conductive areas in total, five in a longitudinal direction (Y-axis direction, a second direction) and eight in a lateral direction (X-axis direction, a first direction), for example. The separation of the first transparent conductive layer 12 into such a number of conductive areas is performed by removing the first transparent conductive layer 12 between the adjacent conductive areas. By this operation, the separated conductive areas are insulated from each other. Here, the Y-axis direction and the X-axis direction may be perpendicular with each other.

In this embodiment, extracting electrode units 13 (a first extracting electrode unit and a second extracting electrode unit) each of which includes plural extracting electrodes are provided at both edges of the upper electrode substrate 10 in the longitudinal direction (Y-axis direction). The extracting electrodes of the extracting electrode units 13 are connected to a flexible substrate 14 at one edge of the upper electrode substrate 10 in the lateral direction through interconnections formed around the upper electrode substrate 10.

The conductive areas of the first transparent conductive layer 12 are connected to the respective extracting electrodes extracting areas. This structure will be explained later in detail.

Referring to FIG. 6, the lower electrode substrate 20 includes four electrodes provided on the second transparent conductive layer 22 at the respective four edges of the rectangular lower electrode substrate 20. The four electrodes are extracted by the extracting interconnection around the lower electrode substrate 20 to be connected to a flexible substrate 27 at one edge of the lower electrode substrate 20 in the lateral direction.

The flexible substrate 14 as shown in FIG. 5 and the flexible substrate 27 as shown in FIG. 6 may be formed to be integrated from a midpoint.

The flexible substrate 14 and the flexible substrate 27 are connected to a host computer through a control circuit (both not shown in the drawings).

The first transparent conductive layer 12 and the second transparent conductive layer 22 may be composed of ITO (Indium Tin Oxide), a material where Al, Ga or the like is added in ZnO (zinc oxide), a material where Sb or the like is added in $SnO_2$ (tin oxide), or the like.

The film substrate 11 may be composed of PET (polyethylene terephthalate), PC (Polycarbonate) or the like. The film substrate 11 may be alternatively composed of a resin material that is transparent in visible regions such as heat-resistant polycarbonate, polyethylene naphthalate, polyether sulfone, cyclic polyolefin, norbornene resin, polyarylate, polypropylene, heat-resistant nylon or the like.

A resin substrate may be used instead of the glass substrate 21. In such a case, the resin substrate may be composed of PET (polyethylene terephthalate), heat-resistant polycarbonate, polyacrylate, polymethacrylate, cyclic polyolefin, norbornene resin, polyallylate, polypropylene, heat-resistant nylon or the like.

As for the touch panel 50 of the present embodiment, when the upper electrode substrate 10 is pushed by a finger or the like, the first transparent conductive layer 12 of the upper electrode substrate 10 and the second transparent conductive layer 22 of the lower electrode substrate 20 contact each other. Then, by detecting the voltage at the contacted area, the contacted area of the upper electrode substrate 10 and the lower electrode substrate 20, meaning the area where the upper electrode substrate 10 is pushed by the finger or the like, can be specified.

For example, the separated conductive areas of first transparent conductive layer 12 of the upper electrode substrate 10 are scanned in a time-share manner so that the conductive area which includes the contacted area can be specified by the timing of detecting the contact.

Here, voltage is alternately applied in the X-axis direction and the Y-axis direction by the four electrodes provided at the respective four edges on the second transparent conductive layer 22 of the lower electrode substrate 20.

As described above, by separating the first transparent conductive layer 12 to form the plural conductive areas in the upper electrode substrate 10, even when the upper electrode substrate 10 and the lower electrode substrate 20 contact at plural positions at a same time, the contacted positions can be specified by the separated conductive areas of the first transparent conductive layer 12. Therefore, the contacted areas can be independently detected.

Further, in addition to detecting the contacted positions even when the first transparent conductive layer 12 and the second transparent conductive layer 22 make contact at plural positions, the contacted positions can be more precisely specified by detecting an electric potential distribution of the second transparent conductive layer 22. Further, even when the contacted positions of the first transparent conductive layer 12 and the second transparent conductive layer 22 are moved, the moved positions can be specified by detecting the electric potential distribution of the second transparent conductive layer 22 as well as detecting the movement.

Further, the conductive areas are formed by removing the first transparent conductive layer 12 between the adjacent conductive areas along the periphery of the conductive areas. With this, adjacent conductive areas can be insulated from each other.

One potential method of removing the first transparent conductive layer 12 is as follows. The first transparent conductive layer 12 may be removed by first irradiating a laser light on regions where the first transparent conductive layer 12 is to be removed, and then the first transparent conductive layer 12 of the irradiated regions are removed by heat or ablation. Alternatively, the first transparent conductive layer 12 may be removed by first applying a photoresist on the first transparent conductive layer 12, forming a resist pattern by irradiation and development with an irradiation apparatus, and removing parts of the first transparent conductive layer 12 not masked by the resist pattern by dry etching or wet etching. Alternatively, the first transparent conductive layer 12 may be removed by printing etching paste on parts of the first transparent conductive layer 12 to be removed. In this embodiment, the first transparent conductive layer 12 may be removed by irradiating the laser light.

Here, as the removed area does not function as the touch panel, when the width of the removed area of the first transparent conductive layer 12 of the touch panel becomes large, the touch panel does not function well. Therefore, the width of the removed area of the first transparent conductive layer 12 may be set smaller than a predetermined value defined by the supposed width of a pen or a finger that touches the touch panel. For example, the predetermined value may be set considering the diameter of penpoint (for example, about 0.8 mm) of a pen or the like.

Concretely, for the touch panel of the present embodiment, as shown in FIG. 5, the first transparent conductive layer 12 of the upper electrode substrate 10 is separated into eight conductive areas in the X-axis direction, and five conductive areas in the Y-axis direction. In the normal touch panel, in order to have the number of extracting electrodes for the extracting electrode units 13 provided at the both edges equal to each other, the first transparent conductive layer 12 of the upper electrode substrate 10 may be separated into an even number of conductive areas in the X-axis direction or the Y-axis direction.

Here, the conductive areas may have a predetermined size and shape in order to increase detecting accuracy in detecting plural contacted points. However, the outer size of the touch panel may be set in accordance with its intended use. Therefore, when forming the conductive areas in the predetermined size and shape, the number of the conductive areas of the first transparent conductive layer 12 of the upper electrode substrate 10 may become an odd number in some cases.

Especially, when the number of the conductive areas in the Y-axis direction becomes an odd number, the number of the extracting electrodes for the extracting electrode units 13 may be uneven as explained above with reference to FIG. 10. When the number of the extracting electrodes for the extracting electrode units 13 are uneven, the shape or the configuration of the touch panel in total becomes uneven to cause the visual balance to become bad as well. In such a case, the use or the like may be limited or usability becomes bad.

Figure 8:
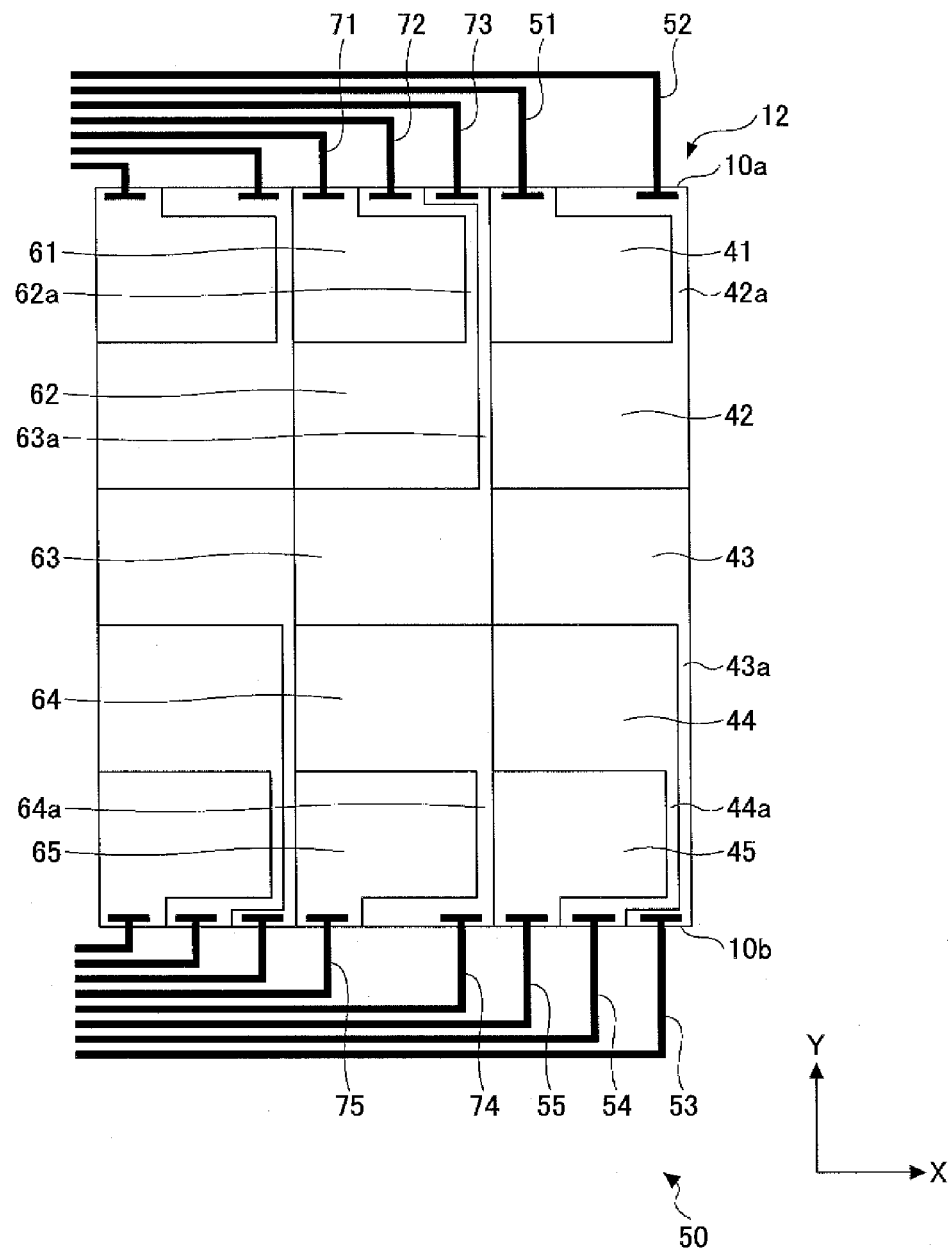
FIG. 8 is an enlarged plan view of the touch panel shown in FIG. 5.

FIG. 8 is an enlarged plan view of the touch panel 50 shown in FIG. 5.

The first transparent conductive layer 12 is composed of a first line of conductive areas (61, 62, 63, 64 and 65) and a second line of conductive areas (41, 42, 43, 44 and 45) adjacent to the first line in the X-axis direction. Here, each of the first and the second lines includes five, an odd number greater than or equal to three, of the conductive areas aligned in the Y-axis direction.

As for the touch panel 50 of the present embodiment, in the first line of the conductive areas, three of the five conductive areas (61, 62 and 63) are extracted toward a first edge 10a of the upper electrode substrate 10 in the Y-axis direction and two of the five conductive areas (64 and 65) are extracted toward a second edge 10b of the upper electrode substrate 10 in the Y-axis direction, while in the second line of the conductive areas, two of the five conductive areas (41 and 42) are extracted toward the first edge 10a and three of the five conductive areas (43, 44 and 45) are extracted toward the second edge 10b.

This means that the conductive area 63 positioned in the middle of the first line is connected with an extracting area 63a extending toward the first edge 10a and the conductive area 43 positioned in the middle of the second line is connected with an extracting area 43a extending toward the second edge 10b.

In this embodiment, plural of the first lines and the second lines are alternately positioned along the X-axis direction. Therefore, the number of the extracting areas extending toward the first edge 10a and the second edge 10b become substantially equal.

However, the touch panel 50 of this embodiment may include a part where the first line and the second line are not alternately positioned as long as the number of the extracting areas extending toward the first edge 10a and the second edge 10b become substantially equal.

Concretely, the first transparent conductive layer 12 is separated into the five conductive areas 41, 42, 43, 44 and 45 in the Y-axis direction at the same X coordinate (second line).

Among the five conductive areas 41, 42, 43, 44 and 45, two conductive areas 41 and 42 are extracted at the first edge 10a of the upper electrode substrate 10. The conductive area 41 nearest to the first edge 10a is connected to the extracting electrode 51, and the conductive area 42 is connected to the extracting electrode 52 through the extracting area 42a.

The rest of the five conductive areas 41, 42, 43, 44 and 45, namely three conductive areas 43, 44 and 45 are extracted at the second edge 10b which is opposing the first edge 10a, of the upper electrode substrate 10. The conductive area 45 nearest to the second edge 10b is connected to the extracting electrode 55, the conductive area 44 is connected to the extracting electrode 54 through the extracting area 44a, and the conductive area 43 is connected to the extracting electrode 53 through the extracting area 43a.

It means that for the conductive areas 41 to 45, the extracting electrode unit 13 formed at the first edge 10a includes the two extracting electrodes 51 and 52, while the extracting electrode unit 13 formed at the second edge 10b includes the three extracting electrodes 53, 54 and 55.

In the line (first line) of the five conductive areas 61, 62, 63, 64 and 65 formed adjacent in the X-axis direction to the line of the five conductive areas 41, 42, 43, 44 and 45, three conductive areas 61, 62 and 63 are extracted at the first edge 10a of the upper electrode substrate 10. The conductive area 61 nearest to the first edge 10a is connected to the extracting electrode 71, the conductive area 62 is connected to the extracting electrode 72 through the extracting area 62a, and the conductive area 63 is connected to the extracting electrode 73 through the extracting area 63a.

The rest of the five conductive areas 61, 62, 63, 64 and 65, namely two conductive areas 64 and 65, are extracted at the second edge 10b of the upper electrode substrate 10. The conductive area 65 nearest to the second edge 10b is connected to the extracting electrode 75, and the conductive area 64 is connected to the extracting electrode 74 through the extracting area 64a.

It means that for the conductive areas 61 to 65, the extracting electrode unit 13 formed at the first edge 10a includes the three extracting electrodes 71, 72 and 73, while the extracting electrode unit 13 formed at the second edge 10b includes the two extracting electrodes 74 and 75.

Therefore, the extracting electrode unit 13 formed at the first edge 10a alternately includes two of the extracting electrodes and three of the extracting electrodes for the lines of the conductive areas along the X-axis direction. Similarly, the extracting electrode unit 13 formed at the second edge 10b alternately includes three of the extracting electrodes and two of the extracting electrodes, opposite to the relationship with the extracting electrode unit 13 formed at the first edge 10a, for the lines of the conductive areas along the X-axis direction. In the touch panel of the present embodiment, such a pattern composed of the second line of the conductive areas 41, 42, 43, 44 and 45 and the first line of the conductive area 61, 62, 63, 64 and 65 is repeatedly formed in the X-axis direction.

When the number of conductive areas separated in the Y-axis direction is a even number, the extracting electrode unit 13 formed at the first edge 10a and the extracting electrode unit 13 formed at the second edge 10b may have a same number of the extracting electrodes at any lines. Further in this embodiment, the extracting electrodes may be formed at edges where the flexible substrate 14 is not connected.

Although the example where the first transparent conductive layer 12 is separated into 8×5 conductive areas is explained in this embodiment, the number of the separations is not limited to this amount. The layout of the present embodiment may be applied to a case where the number of the separations in the longitudinal direction or the lateral direction, in other words the X-axis direction or the Y-axis direction, is an odd number. Concretely, the layout of the present embodiment may be applied when the first transparent conductive layer 12 is separated into an odd number of the conductive areas in the Y-axis direction and the extracting electrode units 13 are provided at the edges in the Y-axis direction along the X-axis direction, as shown in FIG. 8.

For example, even when the first transparent conductive layer 12 is separated into an odd number of the conductive areas in the Y-axis direction, if the extracting electrode units 13 are provided at edges in the X-axis direction along the Y-axis direction and the first transparent conductive layer 12 is separated into an even number of the conductive areas in the X-axis direction, it is not necessary to apply the layout of the present embodiment because the number of the extracting electrodes for both of the extracting electrode units 13 can be even.

Further, the extracting electrode units 13 may be provided along edges where the extracting number of the separated conductive areas are larger in order to reduce the number of or the areas for the extracting areas. For the case shown in FIG. 5 and FIG. 8, the first transparent conductive layer 12 is separated into eight areas in the X-axis direction while it is separated into five areas in the Y-axis direction. It means that eight of the conductive areas exist at the first and the second edges 10a and 10b while only five of the conductive areas exist at the edges aligned in the X-axis direction. Therefore, by providing the extracting electrode units 13 at the first and the second edges 10a and 10b aligned in the Y-axis direction, the number of or the areas for the extracting areas can be reduced compared with when providing the extracting electrode units 13 at the edges aligned in the X-axis direction.

Thus, the layout of the present embodiment may be applied when the number of the conductive areas in the direction where the number of the conductive areas is smaller is an odd number when the number of the separated conductive areas are different in the X-axis direction and the Y-axis direction.

Although in the above embodiment, a case where the first transparent conductive layer 12 of the upper electrode substrate 10 is separated into the plural conductive areas is explained, the second transparent conductive layer 22 of the lower electrode substrate 20 may be similarly separated into plural conductive areas instead of the upper electrode substrate 10.

Figure 9:
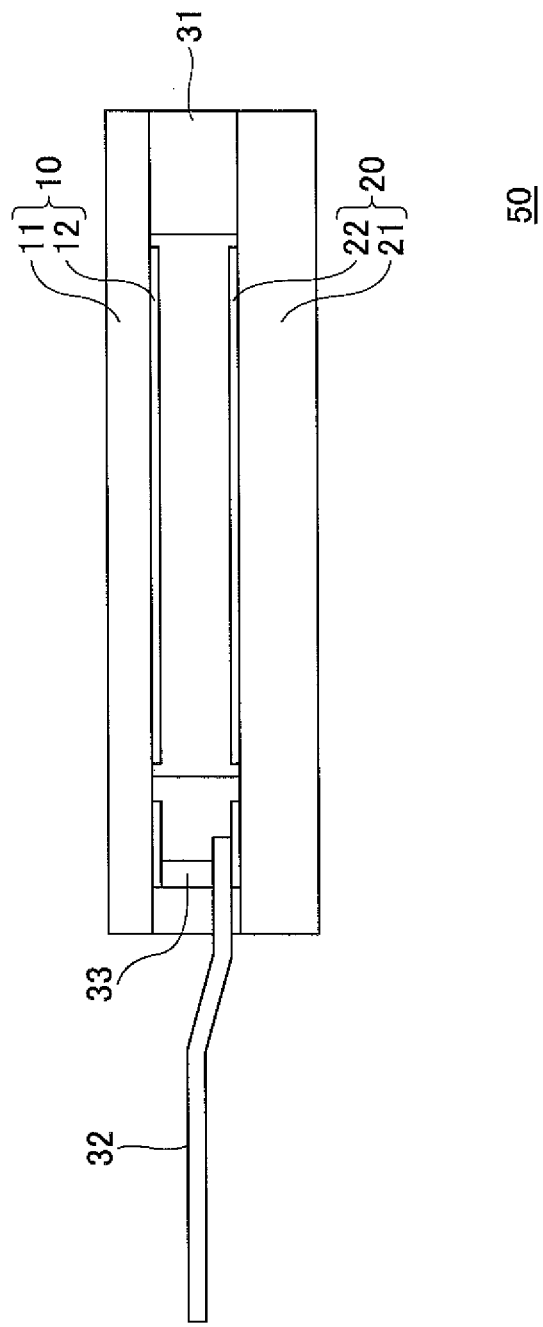
FIG. 9 is a cross-sectional view of another example of the touch panel of the present embodiment.

As shown in FIG. 9, the touch panel 50 of the present embodiment may have a single flexible substrate 32 electrically connected to electrodes of the upper electrode substrate 10 and the lower electrode substrate 20.

Concretely, the extracting electrodes provided at the lower electrode substrate 20 and the respective electrodes provided at the flexible substrate 32 are electrically connected by being contact bonded while the extracting electrodes provided at the upper electrode substrate 10 and the respective electrodes provided at the flexible substrate 32 are electrically connected through connecting electrodes 33 that are formed to penetrate the spacer 31. With this, the extracting electrodes of the upper electrode substrate 10 and the extracting electrodes of the lower electrode substrate 20 are electrically connected to the single flexible substrate 32 provided at the lower electrode substrate 20.

According to the layout of the touch panel 50 of the present embodiment, the touch panel 50 can be provided where the number of interconnects function as the extracting electrodes are substantially even for both edges even when the conductive layer is separated into plural areas for detecting plural contact points at a same time. Therefore, the touch panel 50 of uniform shape and desired configuration can be provided.

Second Embodiment

When the first transparent conductive layer 12 is separated into the plural conductive areas and the plural extracting areas are provided, if any one of the extracting areas is pushed, it may be detected that the conductive area that is connected to the pushed extracting area is pushed. Therefore, a structure for preventing such an error is necessary without bothering operational functions of the touch panel.

The second embodiment will now be explained. In this embodiment, insulating layers are formed on the respective extracting areas of the first transparent conductive layer 12 of the upper electrode substrate 10 when the first transparent conductive layer 12 is separated into the plural conductive areas. The rest of the structures are the same as that of the first embodiment and is not repeated.

When any one of the extracting areas 42a, 43a, 44a, 62a, 63a and 64a of the touch panel 50 shown in FIG. 8 or any one of the extracting areas 342a, 343a and 344a of the touch panel shown in FIG. 10 is touched by a finger or the like, it may be detected that the contacted area is the conductive area that is connected to the respective extracting area. For example, for the touch panel shown in FIG. 8, when the extracting area 43a is touched by a finger or the like, it may be detected that the contacted area is the conductive area 43 connected to the extracting area 43a. In such a case, wrong positional information is detected so that wrong positional information is input.

The touch panel of the present embodiment will be explained with reference to FIG. 11.

Figure 11:
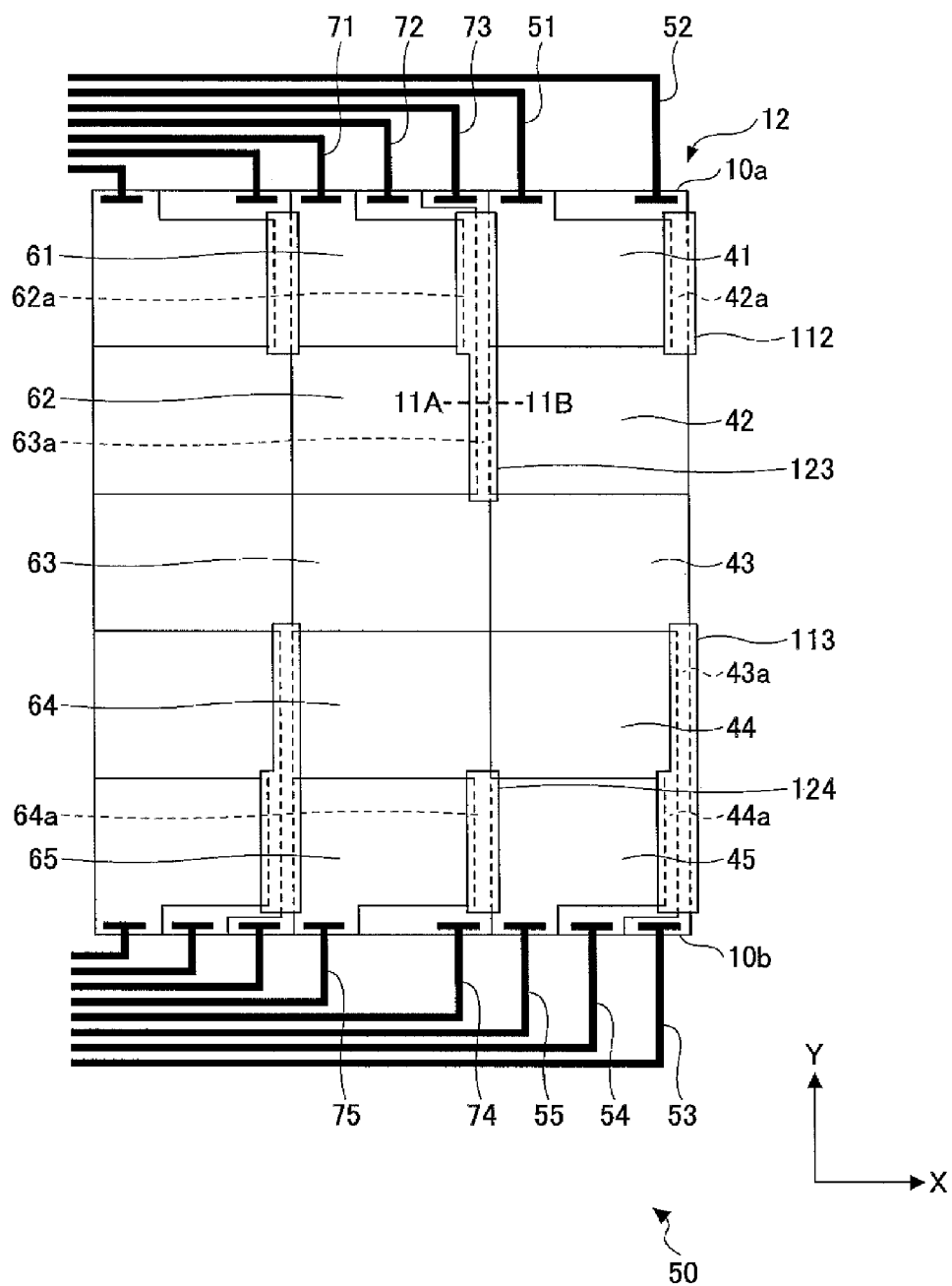
FIG. 11 is an enlarged plan view of the touch panel of the present embodiment.
Figure 12:
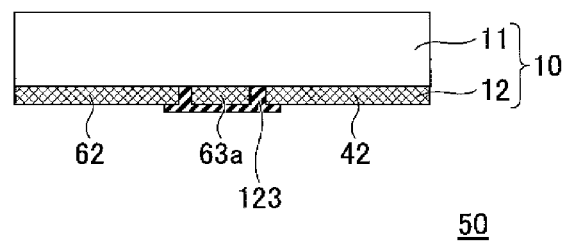
FIG. 12 is a cross-sectional view of the touch panel of the present embodiment.

As shown in FIG. 11, the touch panel 50 of the present embodiment further includes an insulating layer 112 formed on the extracting area 42a, an insulating layer 113 formed on the extracting areas 43a and 44a, an insulating layer 123 formed on the extracting areas 62a and 63a, and an insulating layer 124 formed on the extracting area 64a. For the touch panel 50 of the present embodiment, insulating layers are selectively formed on all of the extracting areas of the first transparent conductive layer 12 of the upper electrode substrate 10. FIG. 12 is a cross-sectional view of the touch panel 50 taken along a line 11A-11B of FIG. 11.

In the touch panel 50 of the present embodiment, the insulating layers (112 and 113 or the like) may have a thickness less than or equal to 20 μm, and more preferably less than or equal to 10 μm. With this thickness, even when the insulating layers are provided, unevenness is prevented from being recognized when touching the upper electrode substrate 10 by a finger or the like, as will be explained later in detail. Therefore, operation of the touch panel 50 can be smoothly performed without feeling unevenness.

Further, the insulating layers (112 and 113 or the like) may have a thickness greater than or equal to 0.05 μm, and more preferably greater than or equal to 0.1 μm. With this thickness, the insulating layers can function as the insulator well.

The insulating layer may be composed of a silicon oxide film, a silicon nitride film, an aluminum oxide film, or a photoresist layer transparent in visible light (simply referred to as a transparent photoresist layer hereinafter).

When the insulating layer is composed of the silicon oxide film, the silicon nitride film, or the aluminum oxide film, the insulating layer may be formed by a sputtering method, a vacuum deposition method, a CVD method (Chemical Vapor Deposition) or the like. Alternatively, when the insulating layer is composed of the silicon oxide film, the silicon nitride film, or the aluminum oxide film, the insulating layer may be formed by coating a solution including silicon oxide, silicon nitride, or aluminum oxide, and drying it.

When the insulating layer is formed by the sputtering method, a dense film can be obtained and therefore, even if the film is thin, enough insulating function can be obtained. In such a case, the thickness of the insulating layer may be less than or equal to 1 μm and more preferably less than or equal to 0.5 μm. With this thickness, even when the insulating layers are provided, unevenness cannot be recognized when touching the upper electrode substrate 10 by a finger or the like.

Further, in such the case, the thickness of the insulating layer may be greater than or equal to 0.05 μm and more preferably greater than or equal to 0.1 μm. With this thickness, the insulating layers can function as the insulator well.

When the insulating layer is composed of the transparent photoresist layer, the insulating layer may be formed by coating a transparent photoresist layer, irradiating an ultraviolet light on the photoresist by an irradiation apparatus, and then developing. In such a case, the insulating layer may be formed at the same time as forming insulating dot spacers provided between the first transparent conductive layer 12 and the second conductive layer 22, not shown in the drawings, to simplify the process. In such a case, the insulating layer may be formed by the same material as the insulating dot spacers.

In this case, the thickness of the insulating layer may be less than or equal to 10 μm. Further, the thickness of the insulating layer may be greater than or equal to 1 μm.

The material for the transparent photoresist layer may be selected considering transparency, denseness, and durability, and the transparent photoresist layer may be a photo curing acrylic resin, a methacrylic resin or its epoxy alteration, or acrylate or methacrylate of urethane alteration or polyester alteration.

The insulating layers may be formed by printing a transparent insulating paste by screen printing, gravure printing or the like. In this case, by forming the insulating layers by the transparent insulating paste at a same time with forming the insulating dot spacers (not shown in the drawings) provided in the touch panel 50 as described above, manufacturing processes can be simplified.

The transparent insulating paste may be composed of an organic material or an inorganic material. For the transparent insulating paste, polyester thermosetting resin, polyacrylic thermosetting resin, silicone thermosetting resin, epoxy thermosetting resin, polyurethane thermosetting resin, methacrylic ultraviolet curing resin or acrylic ultraviolet curing resin may be used. When the thermosetting resin is used, after coating the transparent insulating paste, it is dried to be cured. When the ultraviolet curing resin is used, after coating the transparent insulating paste, an ultraviolet light is irradiated to form the insulating layer.

When the insulating layer is selectively provided on the extracting area 43a or other extracting areas to prevent the electrical contact at the extracting area 43a or other extracting areas between the first transparent conductive layer 12 and the second transparent conductive layer 22 not to cause input of the wrong positional information, if the insulating layer is thick, parts where the insulating layers are formed may protrude from the surface through the upper electrode substrate 10. In such a case, when pushing the upper electrode substrate 10 by a finger or the like, bumpy parts may exist so that it is difficult to input information smoothly. Further, a user may feel uncomfortable. Further, by repeatedly using the touch panel, the transparent conductive layer may bend at the corner where the insulating layer exists and may be cut at the point. Further, when the insulating layers are visible, the quality of the display is lowered as information displayed on the monitor seen through the touch panel may not be clear.

However, according to the present embodiment, as the thickness of the insulating layer is set within a predetermined range, such problems can be solved.

Third Embodiment

Figure 13:
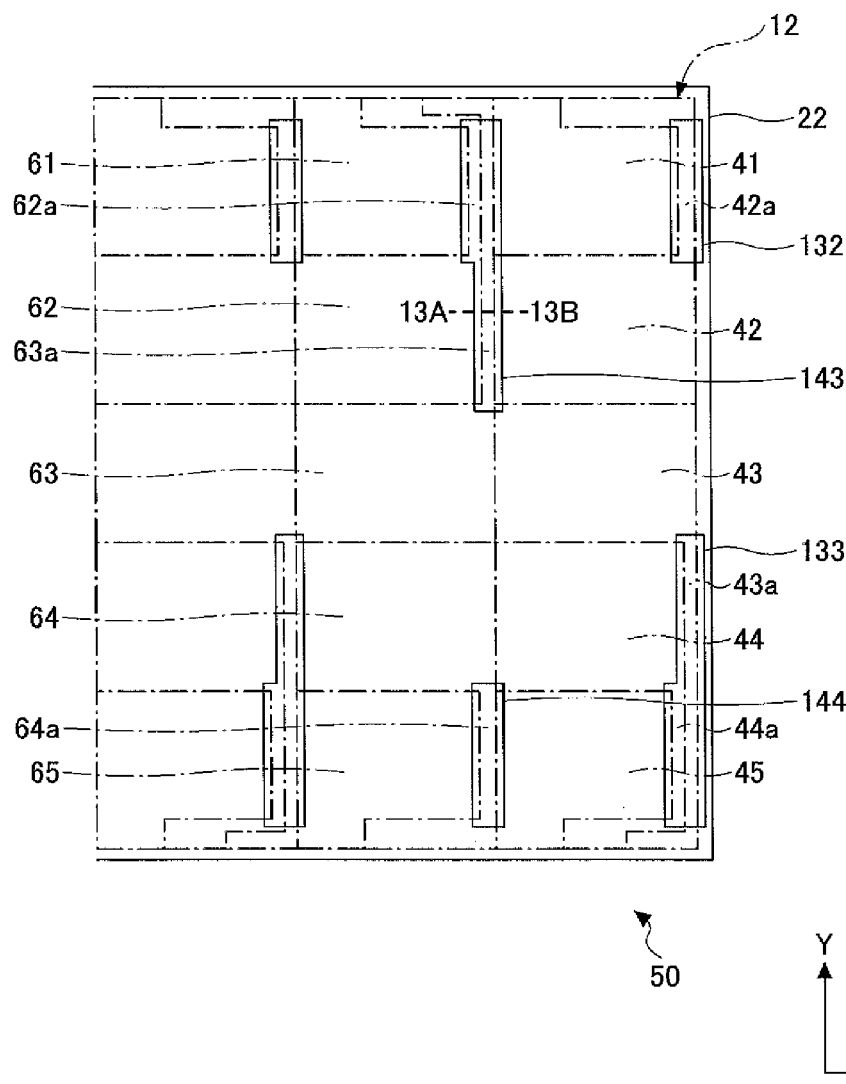
FIG. 13 is an enlarged plan view of the touch panel of the present embodiment.

The third embodiment will be explained. The touch panel of this embodiment includes an insulating layer formed on the second transparent conductive layer 22 of the lower electrode substrate 20 as shown in FIG. 13. The rest of the structures is the same as that of the second embodiment and is not repeated.

Concretely, the touch panel 50 of the embodiment further includes an insulating layer 132, an insulating layer 133, an insulating layer 143, and an insulating layer 144.

The insulating layer 132 is formed on a part of the second transparent conductive layer 22 corresponding to the extracting area 42a of the first transparent conductive layer 12 of the upper electrode substrate 10. Similarly, the insulating layer 133 is formed on a part of the second transparent conductive layer 22 corresponding to the extracting areas 43a and 44a of the first transparent conductive layer 12 of the upper electrode substrate 10. Similarly, the insulating layer 143 is formed on a part of the second transparent conductive layer 22 corresponding to the extracting areas 62a and 63a of the first transparent conductive layer 12 of the upper electrode substrate 10. Similarly, the insulating layer 144 is formed on a part of the second transparent conductive layer 22 corresponding to the extracting areas 64a of the first transparent conductive layer 12 of the upper electrode substrate 10.

Figure 14:
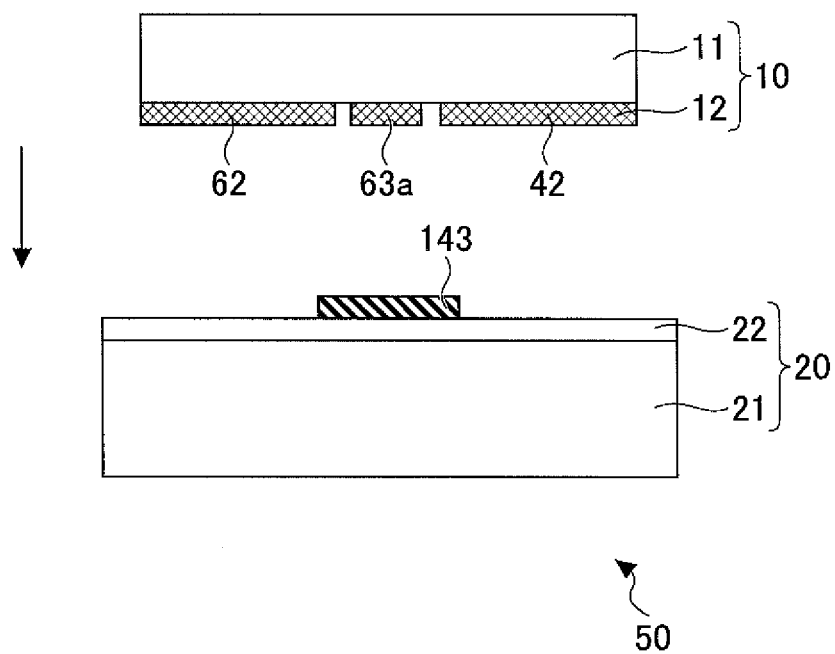
FIG. 14 is a cross-sectional view of the touch panel of the present embodiment.

As described above, according to the touch panel 50 of the present embodiment, insulating layers are formed at all of the parts of the second transparent conductive layer 22 corresponding to all of the extracting areas of the first transparent conductive layer 12 of the upper electrode substrate 10. The dot-dashed lines in FIG. 13 show the conductive areas and the extracting areas of the first transparent conductive layer 12 of the upper electrode substrate 10 corresponding to the lower electrode substrate 20. FIG. 14 is a cross-sectional view of the touch panel 50 taken along a line 13A-13B of FIG. 13.

Further, in this embodiment, the side edges of the insulating layer may be inclined toward the surface of the lower electrode substrate 20 to expand or enlarge the insulating layer in its cross-sectional view as shown in FIG. 16A and FIG. 16B. By forming the insulating layers 143 on the lower electrode substrate 20, the insulating layers 143 may have such a shape.

When the side edges of the insulating layer (123) are inclined toward the surface of the lower electrode substrate 20 to contract the insulating layer in its cross-sectional view as shown in FIG. 15A and FIG. 15B, when the upper electrode substrate 10 of the touch panel is pushed by a pen 100 or the like as shown in FIG. 15B, the upper electrode substrate 10 may acutely bend at a surface facing the lower electrode substrate 20. This may cause disconnection of the first transparent conductive layer 12 of the upper electrode substrate 10 especially when the insulating layer 123 is thick.

When, on the other hand, the insulating layer 143 has the shape as shown in FIG. 16A and FIG. 16B as described above, even when the upper electrode substrate 10 of the touch panel is pushed by a pen 100 or the like as shown in FIG. 16B, the upper electrode substrate 10 smoothly bends along the side edge of the insulating layer 143. Thus, the first transparent conductive layer 12 of the upper electrode substrate 10 may not cut easily compared with a case as shown in FIG. 15A and FIG. 15B.

Provided that the side edges of the insulating layer are inclined as expanding or enlarging toward the surface of the lower electrode substrate 20 in its cross-sectional view, even when the insulating layers are provided at the upper electrode substrate 10, same effects can be obtained.

Although the touch panel of the five-wire type is explained in the above embodiments, other types of the touch panel such as a seven-wire type may be used.

EXAMPLE

Example 1

For an example 1, the touch panel as described in the second embodiment was formed. For the upper electrode substrate, a PET film with a thickness of 188 μm was used that includes an ITO layer as the transparent conductive layer formed on its surface. The conductive areas and the extracting areas were formed by removing parts of the ITO layer. Thereafter, a silicon oxide film (SiO$_2$) is selectively formed on the extracting areas by a sputtering process to have a thickness about 0.1 μm. When forming the silicon oxide film by the sputtering method, a metal mask composed of a material such as stainless or the like was used that includes openings corresponding to the areas, that is the extracting areas, where the insulating layers are to be formed. As the transparency of the silicon oxide film is high, no influence on visibility of the formed touch panel existed.

Figure 17:
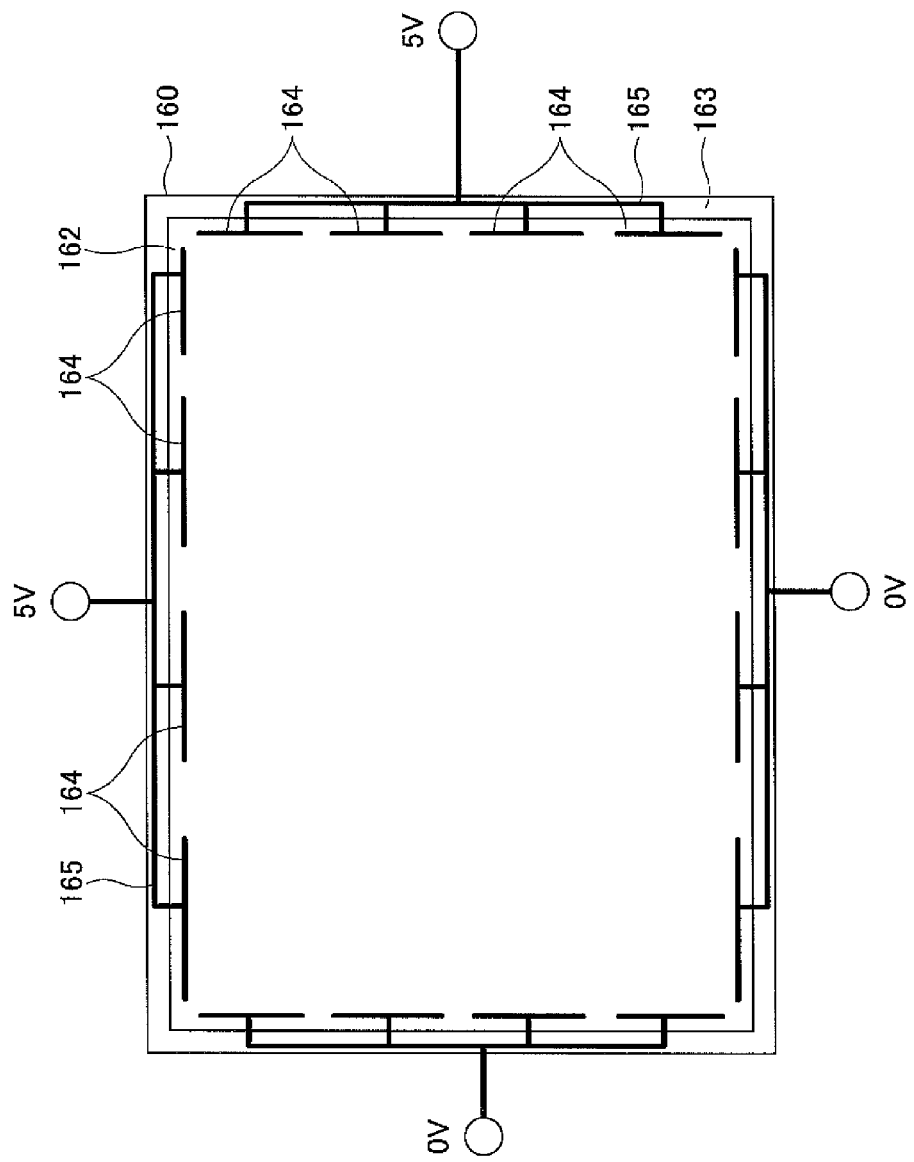
FIG. 17 is an explanatory view for explaining a method of forming the touch panel of the present embodiment.

As shown in FIG. 17, for the lower electrode substrate 160, a glass substrate with a thickness of 1.1 mm was used that includes an ITO layer 162 as the transparent conductive layer formed on its surface. After the ITO layer 162 was removed from the circumference of the lower electrode substrate 160 by etching, insulating dot spacers were formed by photoresist, and then the silver electrodes 164 and the silver interconnects 165 were formed at four edges of the glass substrate on the ITO layer and on the area where the ITO layer is removed by screen printing using silver paste.

As shown in FIG. 18A, the upper electrode substrate 150 and the lower electrode substrate 160 were adhered by double-sided tape 171, extracting lines 172 were contact bonded to the upper electrode substrate 150, and the extracting lines 173 were contact bonded to the lower electrode substrate 160 to form the touch panel as shown in FIG. 18B. The upper electrode substrate 150 corresponds to the upper electrode substrate 10 as described above, while the lower electrode substrate 160 corresponds to the lower electrode substrate 20 as described above.

For the thus formed touch panel, the etched part of the ITO layer or the insulating layers formed on the extracting areas were almost invisible from the upper electrode substrate 150 side, and the visibility was very good when it is placed on an LCD (liquid crystal display) panel.

Further, input operations of the touch panel of the example 1 when two or more points are contacted were tested by connecting a control circuit to the touch panel of the example 1. As a result, smooth operations can be performed by gesture operations such as enlarging, reduction, rotation or the like. As for the touch panel of the example 1, the ITO layer of the upper electrode substrate 150 is separated into 16×8 conductive areas and resolution was good as well.

As for the touch panel of the example 1, a thermal shock test (−40° C. to +85° C., 0.5 hours and 1000 cycles for each) was performed. As a result, an initial characteristic was retained and high reliability was confirmed.

Further, a high temperature and high humidity preserved test (85° C., 85% RH, 1000 hours) was also performed. As a result, no characteristic change had occurred and a high reliability was confirmed.

Further, a writing durability test (polyacetal penpoint, R 0.8 mm, load 2.45 N, Japanese characters (kana) of one million words) with a touch pen was also performed. As a result, no change in writing characteristic had occurred and good durability was confirmed.

Example 2

For an example 2, the touch panel as described in the third embodiment was formed. For the upper electrode substrate, a PET film with a thickness of 188 μm was used that includes an ITO layer as the transparent conductive layer formed on its surface. The conductive areas and the extracting areas were formed by removing parts of the ITO layer.

Further, as shown in FIG. 17, for the lower electrode substrate 160, a glass substrate with a thickness of 1.1 mm was used that includes an ITO layer 162 as the transparent conductive layer formed on its surface. After the ITO layer 162 was removed from the circumference of the lower electrode substrate by etching, insulating dot spacers and the insulating layers were formed by photoresist. The insulating layers were formed at a same time as the insulating dot spacers were formed by forming the photoresist at the areas corresponding to the extracting areas of the upper electrode substrate. The thickness of the photoresist to form the insulating layers and the insulating dot spacers was about 4 µm. After that, the silver electrodes 164 and the silver interconnects 165 were formed at four edges of the glass substrate on the ITO layer and on the area where the ITO layer is removed by screen printing using silver paste.

As shown in FIG. 18A, the upper electrode substrate 150 and the lower electrode substrate 160 were adhered by a double-sided tape 171, extracting lines 172 were contact bonded to the upper electrode substrate 150, and the extracting lines 173 were contact bonded to the lower electrode substrate 160 to form the touch panel as shown in FIG. 18B.

The touch panel of this example has a good appearance, good usability and good reliability.

Example 3

The touch panel having the same structure as that of the example 1 except for the insulating layers was formed. Here, for the insulating layers of the upper electrode substrate, polyester thermosetting resin (polyester resin) with a thickness of about 20 µm was formed by screen printing.

Example 4

The touch panel having the same structure as that of the example 1 except for the insulating layers was formed. Here, for the insulating layers of the upper electrode substrate, polyester thermosetting resin (polyester resin) with a thickness of about 15 µm was formed by screen printing.

Example 5

The touch panel having the same structure as that of the example 1 except for the insulating layers was formed. Here, for the insulating layers of the upper electrode substrate, polyester thermosetting resin (polyester resin) with a thickness of about 10 µm was formed by gravure printing.

Example 6

The touch panel having the same structure as that of the example 2 except for the insulating layers was formed. Here, for the insulating layers of the lower electrode substrate, polyester thermosetting resin (polyester resin) with a thickness of about 20 µm was formed by screen printing.

Example 7

The touch panel having the same structure as that of the example 2 except for the insulating layers was formed. Here, for the insulating layers of the lower electrode substrate, polyester thermosetting resin (polyester resin) with a thickness of about 10 µm was formed by gravure printing.

Example 8

The touch panel having the same structure as that of the example 2 except for the insulating layers was formed. Here, for the insulating layers of the lower electrode substrate, acrylic thermosetting resin (acrylic resin) with a thickness of about 10 µm was formed by gravure printing.

Example 9

The touch panel having the same structure as that of the example 2 except for the insulating layers was formed. Here, for the insulating layers of the lower electrode substrate, silicone thermosetting resin (silicone resin) with a thickness of about 10 µm was formed by gravure printing.

Example 10

The touch panel having the same structure as that of the example 2 except for the insulating layers was formed. Here, for the insulating layers of the lower electrode substrate, epoxy thermosetting resin (epoxy resin) with a thickness of about 15 µm was formed by gravure printing.

Example 11

The touch panel having the same structure as that of the example 2 except for the insulating layers was formed. Here, for the insulating layers of the lower electrode substrate, polyurethane thermosetting resin (polyurethane resin) with a thickness of about 10 µm was formed by gravure printing.

Example 12

The touch panel having the same structure as that of the example 2 except for the insulating layers was formed. Here, for the insulating layers of the lower electrode substrate, acrylic ultraviolet curing resin with a thickness of about 5 µm was formed by gravure printing.

Example 13

The touch panel having the same structure as that of the example 2 except for the insulating layers was formed. Here, for the insulating layers of the lower electrode substrate, $SiO_2$ film with a thickness of about 1 µm was formed by coating a solution including $SiO_2$ by spray coating or the like and drying.

Relative Example 1

The touch panel having the same structure as that of the example 1 except for the insulating layers was formed. Here, for the insulating layers of the upper electrode substrate, polyester thermosetting resin (polyester resin) with a thickness of about 25 µm was formed by screen printing.

Relative Example 2

The touch panel having the same structure as that of the example 1 except for the insulating layers was formed. Here, for the insulating layers of the upper electrode substrate, acrylic thermosetting resin (acrylic resin) with a thickness of about 30 µm was formed by screen printing.

Relative Example 3

The touch panel having the same structure as that of the example 1 except for the insulating layers was formed. Here, for the insulating layers of the upper electrode substrate, silicone thermosetting resin (silicone resin) with a thickness of about 30 µm was formed by screen printing.

Relative Example 4

The touch panel having the same structure as that of the example 1 except for the insulating layers was formed. Here, for the insulating layers of the upper electrode substrate, epoxy thermosetting resin (epoxy resin) with a thickness of about 25 μm was formed by screen printing.

Relative Example 5

The touch panel having the same structure as that of the example 2 except for the insulating layers was formed. Here, for the insulating layers of the lower electrode substrate, polyester thermosetting resin (polyester resin) with a thickness of about 30 μm was formed by screen printing.

Relative Example 6

The touch panel having the same structure as that of the example 2 except for the insulating layers was formed. Here, for the insulating layers of the lower electrode substrate, acrylic thermosetting resin (acrylic resin) with a thickness of about 30 μm was formed by screen printing.

Relative Example 7

The touch panel having the same structure as that of the example 2 except for the insulating layers was formed. Here, for the insulating layers of the lower electrode substrate, a silicone thermosetting resin (silicone resin) with a thickness of about 25 μm was formed by screen printing.

Relative Example 8

The touch panel having the same structure as that of the example 2 except for the insulating layers was formed. Here, for the insulating layers of the lower electrode substrate, epoxy thermosetting resin (epoxy resin) with a thickness of about 25 μm was formed by screen printing.

Relative Example 9

The touch panel having the same structure as that of the example 2 except for the insulating layers was formed. Here, for the insulating layers of the lower electrode substrate, acrylic ultraviolet curing resin with a thickness of about 30 μm was formed by screen printing.

The evaluated results of the touch panels of the examples 1 to 13, and the relative examples 1 to 9 are shown in tables 1 and 2.

TABLE 1

| | UPPER SUBSTRATE (ITO/PET FILM) | | | | | |
|---|---|---|---|---|---|---|
| | INSULATING | | THICKNESS | TOUCH PANEL | | |
| | LAYER | METHOD | (μm) | APPEARANCE | USABILITY | DURABILITY |
| example 1 | SiO$_2$ | sputtering | 0.1 | AA | AA | >one million |
| example 3 | polyester resin | screen printing (thermal cure) | 20 | A | A | 500 thousand |
| example 4 | polyester resin | screen printing (thermal cure) | 15 | A | A | 800 thousand |
| example 5 | polyester resin | gravure printing (thermal cure) | 10 | A | A | >one million |
| relative 1 | polyester resin | screen printing (thermal cure) | 25 | BAD | BAD | 20 thousand NG |
| relative 2 | acrylic resin | screen printing (thermal cure) | 30 | BAD | BAD | 20 thousand NG |
| relative 3 | silicone resin | screen printing (thermal cure) | 30 | BAD | BAD | 20 thousand NG |
| relative 4 | epoxy resin | screen printing (thermal cure) | 25 | BAD | BAD | 10 thousand NG |

TABLE 2

| | LOWER SUBSTRATE (ITO/GLASS) | | | | | |
|---|---|---|---|---|---|---|
| | | | THICKNESS | TOUCH PANEL | | |
| | INSULATING LAYER | METHOD | (μm) | APPEARANCE | USABILITY | DURABILITY |
| example 2 | photoresist | photolithography | 4 | AA | AA | >one million |
| example 6 | polyester resin | screen printing (thermal cure) | 20 | A | A | >one million |
| example 7 | polyester resin | gravure printing (thermal cure) | 10 | A | A | >one million |
| example 8 | acrylic resin | gravure printing (thermal cure) | 10 | A | A | >one million |
| example 9 | silicone resin | gravure printing (thermal cure) | 10 | A | A | >one million |
| example 10 | epoxy resin | gravure printing (thermal cure) | 15 | A | A | >one million |
| example 11 | polyurethane resin | gravure printing (thermal cure) | 10 | A | A | >one million |
| example 12 | acrylic ultraviolet curing resin | gravure printing (uv cure) | 5 | AA | AA | >one million |
| example 13 | SiO$_2$ solution | spray coating | 1 | AA | AA | >one million |
| relative 5 | polyester resin | screen printing (thermal cure) | 30 | BAD | BAD | 50 thousand NG |
| relative 6 | acrylic resin | screen printing (thermal cure) | 30 | BAD | BAD | 50 thousand NG |
| relative 7 | silicone resin | screen printing (thermal cure) | 25 | BAD | BAD | 80 thousand NG |
| relative 8 | epoxy resin | screen printing (thermal cure) | 25 | BAD | BAD | 50 thousand NG |
| relative 9 | acrylic ultraviolet curing resin | screen printing (uv cure) | 30 | BAD | BAD | 50 thousand NG |

As shown in tables 1 and 2, for the examples 3 to 13, the same as the examples 1 and 2, good results as the touch panels can be obtained. For the touch panels of the examples 1, 2, and 5 to 13, the writing durability is more than a million words. Further, for the touch panels of the examples 3 and 4, although the writing durability is less than or equal to a million words, the writing durability is greater than or equal to 500 thousand words and there is no problem in use.

However, for the touch panels of the relative examples 1 to 9, the areas where the insulating layers are formed become a milky color, and when the touch panels are placed on the LCD panel, there is a bad influence on visibility.

Further, input operations of the touch panel of the relative example 1 when two or more points are contacted were tested by connecting a control circuit to the touch panel of the relative example 1. As a result, smooth operations cannot be performed by gesture operations such as enlarging, reduction, rotation or the like because of the bumpy surface of the area where the insulating layers are formed.

Further, for the touch panels of the relative examples 1 to 9, the writing durability is less than or equal to a hundred thousand words and there is a problem in use.

In tables 1 and 2, for the appearance (whether the insulating layer is visible or not), "AA" means invisible, "A" means almost invisible, and "BAD" means visible (display failure on visibility).

Further, for the usability (whether the surface is bumpy or not), "AA" means very smooth for a finger or a pen, "A" means smooth for a finger or a pen, and "BAD" means not smooth for a finger or a pen (operation failure).

Further, for the writing durability (just shown as "durability" in the drawing), the test was conducted by writing Japanese characters (kana) of 7.5 mm×6.75 mm randomly within an area of 10 mm×9 mm under the condition of polyacetal penpoint, R 0.8 mm, load 0.24 N, and determined to be NG when the input position is detected at a wrong position or when the input becomes impossible.

The present invention is not limited to the specifically disclosed embodiments, and variations and modifications may be made without departing from the scope of the present invention.

The present application is based on Japanese Priority Application No. 2010-279716 filed on Dec. 15, 2010, the entire contents of which are hereby incorporated herein by reference.

What is claimed is:

1. A touch panel comprising:
   a first electrode substrate that includes a first substrate and a first conductive layer formed on the first substrate;
   a second electrode substrate that includes a second substrate and a second conductive layer formed on the second substrate and is stacked with the first electrode substrate such that the first conductive layer and the second conductive layer face each other; and
   electrodes provided at four edges of the second conductive layer to generate an electric potential distribution in the second conductive layer;
   wherein the first conductive layer is composed of a first line of conductive areas and a second line of conductive areas adjacent to the first line in a first direction where each of the first and the second lines includes an odd number greater than or equal to three of the conductive areas aligned in a second direction different from the first direction between a first edge and a second edge of the first conductive layer aligned in the second direction,
   each of the conductive areas not positioned at the first or the second edges of the first electrode substrate is connected with an extracting area that extends toward one of the first and the second edges, and
   one of the conductive areas positioned in the middle of the first line is connected with the extracting area extending toward the first edge and one of the conductive areas positioned in the middle of the second line is connected with the extracting area extending toward the second edge;
   wherein the number of extracting areas towards the first edge and the number of extracting areas towards the second edge alternate along the first direction.

2. The touch panel according to claim 1, wherein the first conductive layer is composed of plural of the first lines and the second lines alternately positioned along the first direction.

3. The touch panel according to claim 1, further comprising:
   a first extracting electrode unit provided at the first edge of the first electrode substrate and including extracting electrodes; and
   a second extracting electrode unit provided at the second edge of the first electrode substrate and including extracting electrodes;
   wherein the extracting areas extending toward the first edge are electrically connected to the respective extracting electrode of the first extracting electrode unit and the extracting areas extending toward the second edge are electrically connected to the respective extracting electrodes of the second extracting electrode unit.

4. The touch panel according to claim 3, wherein the number of the extracting electrodes provided at the first edge and the number of the extracting electrodes provided at the second edge are substantially equal.

5. The touch panel according to claim 1, wherein the number of the separated conductive areas in the second direction is smaller than the number of the separated conductive areas in the first direction.

6. The touch panel according to claim 1, further comprising: an insulating layer selectively positioned at the extracting areas of the first conductive layer between the first conductive layer and the second conductive layer.

7. The touch panel according to claim 6, wherein the first electrode substrate is an upper electrode substrate that is pushed when inputting information and the insulating layer is formed having a side edge which is inclined toward the surface of the second electrode substrate to expand the insulating layer when seen in a cross-sectional view.

8. The touch panel according to claim 6, wherein the insulating layer is formed on the first electrode substrate.

9. The touch panel according to claim 6, wherein the insulating layer is formed on the second electrode substrate.

10. The touch panel according to claim 6, wherein the insulating layer is composed of a silicon oxide film, a silicon nitride film, an aluminum oxide film, a transparent photoresist layer, or a film obtained by using polyester thermosetting resin, polyacrylic thermosetting resin, silicone thermosetting resin, epoxy thermosetting resin, polyurethane thermosetting resin, methacrylic ultraviolet curing resin or acrylic ultraviolet curing resin.

11. The touch panel according to claim 6, wherein the insulating layer is formed by a sputtering method, a vacuum deposition method, or a chemical vapor deposition method.

12. The touch panel according to claim 6, further comprising: insulating dot spacers provided between the first conductive layer and the second conductive layer, wherein the insulating layer is formed of the same material as the insulating dot spacers.

13. A touch panel comprising:

an upper electrode substrate that includes an upper conductive layer formed on a first substrate;

a lower electrode substrate that includes a lower conductive layer formed on a second substrate;

electrodes provided at four edges of the lower conductive layer to generate an electric potential distribution in the lower conductive layer;

wherein the upper conductive layer and the lower conductive layer are provided such as to face each other;

wherein the upper conductive layer has a plurality of separated conductive areas in a first direction and a plurality of separated conductive areas in a second direction crossing the first direction;

wherein, in the first direction the upper conductive layer is separated into an odd number of 3 or more of the conductive areas;

wherein groups of the conductive areas among the plurality of conductive areas each have extracting areas that extend either towards a first edge in the first direction or extend towards a second edge in the first direction;

wherein said groups are oriented such that the number of extracting areas of groups at the first edge and the number of extracting areas of groups at the second edge alternate along the second direction.

14. The touch panel according to claim 13, wherein the number of extracting areas connected to a first electrode is the same as the number of extracting areas connected to a second electrode.

15. The touch panel according to claim 13, wherein the separated conductive areas in the first direction include a first line of separated conductive areas and a second line of separated conductive areas adjacent to the first line of separated conductive areas, and wherein the number of extracting areas connecting the first line of separated conductive areas and a first electrode is equal to the number of extracting areas connecting the second line of separated conductive areas and a second electrode.

16. A touch panel comprising:

a first electrode substrate that includes a first conductive layer formed on a first substrate, wherein said first conductive layer is separated into M conductive areas in a first direction and N conductive areas in a second direction that crosses said first direction, wherein M is an integer greater than or equal to 2 and N is an odd number greater than or equal to 3;

a second electrode substrate including a second conductive layer formed on a second substrate;

a plurality of first extracting electrodes provided at a first edge, in said second direction, of said first conductive layer;

a plurality of second extracting electrodes provided at a second edge, in said second direction, of said first conductive layer; and a plurality of extracting areas, each of which connects a conductive area that does not face either the first edge or the second edge with one of the first electrodes or one of the second electrodes;

wherein the extracting areas are provided such that, in an odd numbered line of N conductive areas an extracting area connects a first electrode and a conductive area that is positioned at the center of said N conductive areas in said odd numbered line, and wherein the extracting areas are provided such that, in an even numbered line of N conductive areas an extracting area connects a second electrode and a conductive area that is positioned at the center of said N conductive areas in said even numbered line;

wherein the number of extracting areas connected to the first electrode and the number of extracting areas connected to the second electrode alternate along the first direction.

* * * * *